(12) United States Patent
Bouley et al.

(10) Patent No.: US 11,392,374 B2
(45) Date of Patent: Jul. 19, 2022

(54) CONFIGURATION PACKAGES FOR SOFTWARE PRODUCTS

(71) Applicant: FAIR ISAAC CORPORATION, Roseville, MN (US)

(72) Inventors: Ken Bouley, Point Reyes Station, CA (US); Bruno Courbage, San Rafael, CA (US); Mark Allen Richardson, Petaluma, CA (US)

(73) Assignee: FAIR ISAAC CORPORATION, Roseville, MN (US)

( * ) Notice: Subject to any disclaimer, the term of this patent is extended or adjusted under 35 U.S.C. 154(b) by 0 days.

(21) Appl. No.: 17/206,637

(22) Filed: Mar. 19, 2021

(65) Prior Publication Data

US 2021/0279053 A1 Sep. 9, 2021

Related U.S. Application Data

(63) Continuation of application No. 16/231,168, filed on Dec. 21, 2018, now Pat. No. 10,956,152, which is a
(Continued)

(51) Int. Cl.
*G06F 8/60* (2018.01)
*G06F 8/76* (2018.01)

(52) U.S. Cl.
CPC . *G06F 8/76* (2013.01); *G06F 8/60* (2013.01)

(58) Field of Classification Search
CPC .................................................... G06F 8/60
See application file for complete search history.

(56) References Cited

U.S. PATENT DOCUMENTS

| 5,497,334 A | 3/1996 | Russell et al. |
| 5,517,645 A | 5/1996 | Stutz et al. |

(Continued)

OTHER PUBLICATIONS

Andreas Schraitle ("Provisioning of Customizable Pattern-based Software Artifacts into Cloud Environments", Institute of Architecture of Application Systems, University of Stuttgart, Stuttgart, Germany, Sep. 6, 2013, pp. 1-111) (Year: 2013).
(Continued)

*Primary Examiner* — Jae U Jeon
(74) *Attorney, Agent, or Firm* — Mintz, Levin, Cohn, Ferris, Glovsky and Popeo, P.C.; F. Jason Far-hadian, Esq.

(57) ABSTRACT

A configuration package receives user-generated input that configures a decision service to generate decision data. The configuration package includes artifacts and the user-generated input selects the artifacts from an artifact library in a configuration database. A configured decision service is generated, where the generating includes receiving, by a decision service factory, the configuration package. Also, the decision service factory receives a decision template including configurable decision elements and non-configurable decision elements. Further, the decision service factory receives a user configuration specifying a parameter in the corresponding artifact. The artifact from the configuration package, the user configuration and the decision template are combined to generate the configured decision service. The configured decision service receives, from a client computer, input for each of the configurable decision elements. Based on the received input, the decision data is generated by the configured decision service. The generated decision data is transmitted to the client computer.

20 Claims, 4 Drawing Sheets

Related U.S. Application Data continuation of application No. 14/940,133, filed on Nov. 12, 2015, now Pat. No. 10,162,630.

(60) Provisional application No. 62/078,325, filed on Nov. 11, 2014.

(56) References Cited

U.S. PATENT DOCUMENTS

| | | |
|---|---|---|
| 6,615,199 B1 | 9/2003 | Bowman-Amuah |
| 6,931,599 B1 | 8/2005 | Korenshtein |
| 7,272,820 B2 | 9/2007 | Klianev |
| 7,665,064 B2 | 2/2010 | Able et al. |
| 8,386,525 B2 | 2/2013 | Pace et al. |
| 8,417,715 B1 | 4/2013 | Bruckhaus et al. |
| 8,417,938 B1 | 4/2013 | Considine et al. |
| 9,588,790 B1 | 3/2017 | Wagner et al. |
| 9,690,575 B2 | 6/2017 | Prismon et al. |
| 2002/0104068 A1 | 8/2002 | Barrett et al. |
| 2005/0085937 A1 | 4/2005 | Goodwin et al. |
| 2005/0278348 A1 | 12/2005 | Falter et al. |
| 2007/0220022 A1 | 9/2007 | Lankinen et al. |
| 2008/0172673 A1 | 7/2008 | Naik |
| 2008/0209392 A1 | 8/2008 | Able et al. |
| 2008/0307211 A1 | 12/2008 | An et al. |
| 2009/0257436 A1* | 10/2009 | Qu .................. H04L 12/2883 370/395.1 |
| 2010/0306772 A1 | 12/2010 | Arnold et al. |
| 2010/0333083 A1 | 12/2010 | Chancey et al. |
| 2012/0185821 A1 | 7/2012 | Yaseen et al. |
| 2013/0006707 A1 | 1/2013 | Ssubhanjan |
| 2013/0239089 A1 | 9/2013 | Eksten et al. |
| 2014/0052773 A1 | 2/2014 | Deng et al. |
| 2014/0075032 A1 | 3/2014 | Vasudevan et al. |
| 2014/0075033 A1 | 3/2014 | Doering et al. |
| 2014/0244799 A1 | 8/2014 | Kundgol et al. |
| 2014/0250306 A1* | 9/2014 | Ziegler .................. G06F 21/602 726/17 |
| 2014/0278807 A1 | 9/2014 | Bohacek |
| 2015/0058467 A1* | 2/2015 | Douglas .................. H04L 67/16 709/223 |
| 2015/0067171 A1 | 3/2015 | Yum et al. |
| 2015/0113160 A1* | 4/2015 | Sun ....................... H04L 65/602 709/231 |
| 2015/0156280 A1 | 6/2015 | Vaswani et al. |
| 2015/0205602 A1 | 7/2015 | Prismon et al. |
| 2018/0246960 A1 | 8/2018 | Rathod |

OTHER PUBLICATIONS

*Decision Model and Notation.* Object Management Group, 2015. 182 pages.

Fallon, L. et al. (2014). "Applying Semantics to Optimize End-User Services in Telecommunication Networks", OTM Confederated International Conferences, "On the Move to Meaningful Internet Systems", Springer, Berlin, Heidelberg, 2014, pp. 1-10.

Hatcliff, John, et al., "Cadena: An Integrated Development, Analysis, and Verification Environment for Component-based Systems", ICSE '03, Portland, OR, May 3-10, 2003, 13 pages.

Jayasinghe, Deepal, et. al. "Improving Performance and Availability of Services Hosted on IaaS Clouds with Structural Constraint-Aware Virtual Machine Placement." *2011 International Conference on Services Computing*, IEEE. pp. 72-79.

Lau, Kung-Kiu, et al., "Software Component Models", IEEE Transactions on Software Engineering, vol. 33, No. 10, Oct. 2007, pp. 709-724.

Li, Jim, et al. "Fast Scalable Optimization to Configure Service Systems Having Cost and Quality of Service." *Proceedings of the 6th International Conference on Automatic Computing*, Jun. 15-19, 2009, Barcelona Spain, pp. 159-168.

\* cited by examiner

CONFIGURATION PACKAGES FOR SOFTWARE PRODUCTS

CROSS-REFERENCE TO RELATED APPLICATIONS

The current application is a continuation of and claims the benefit of the earlier filing date and priority to U.S. application Ser. No. 16/231,168, filed on Dec. 12, 2018, which in turn claims priority to U.S. application Ser. No. 14/940,133, filed on Nov. 12, 2015, which in turn claims priority to Provisional Application Ser. No. 62/078,325 filed Nov. 11, 2014, the contents of all of said Applications are hereby incorporated by reference herein in their entirety.

TECHNICAL FIELD

The subject matter described herein relates to configuration software, for example configuring pre-compiled code frameworks.

BACKGROUND

Software is frequently sold or distributed as pre-compiled computer products that may be restricted by, platform, language, etc. Software shared from user to user and for a wide variety of applications often needs customization to either be of use to the particular user or to be used on a particular machine, often involving the re-writing of code. The re-writing of code can result in variations in functionality or output as well as being difficult or impossible for the end-user.

SUMMARY

In one aspect, a configuration package stored on a computer memory and accessible by one or more processors, receives user-generated input that configures a decision service to generate decision data. The configuration package includes artifacts and the user-generated input selects the artifacts from an artifact library in a configuration database.

A configured decision service is generated, where the generating includes receiving, by a decision service factory, the configuration package. Also, the decision service factory receives a decision template including configurable decision elements and non-configurable decision elements. Further, the decision service factory receives a user configuration specifying a parameter in the corresponding artifact. The artifact from the configuration package, the user configuration and the decision template are combined to generate the configured decision service.

The configured decision service receives, from a client computer, input for each of the configurable decision elements. Based on the received input, the decision data is generated by the configured decision service. The generated decision data is transmitted to the client computer.

In some variations, one or more of the following features can be present in any combination.

A consistency check can be performed that verifies that the configured decision service does not violate at least one predetermined rule. An error message can be generated describing the violation of the predetermined rule and provided to a user via a graphical user interface.

The configuration package can be received by the deployment server from a remote computing system. The configured decision service can be transmitted to a remote computing system.

The configurable decision element in the framework can be updated, in response to the artifacts received by the configured decision service, to correspond to the received artifacts.

The input can be received by at least one call to the client computer running a web service.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

The details of one or more variations of the subject matter described herein are set forth in the accompanying drawings. The current subject matter describes using configuration packages to configure, by a user, a static computer framework. By using one or more configuration packages tailored to a specific application or task, this allows the framework to be reused with no change in the underlying programming code.

Figure 1:
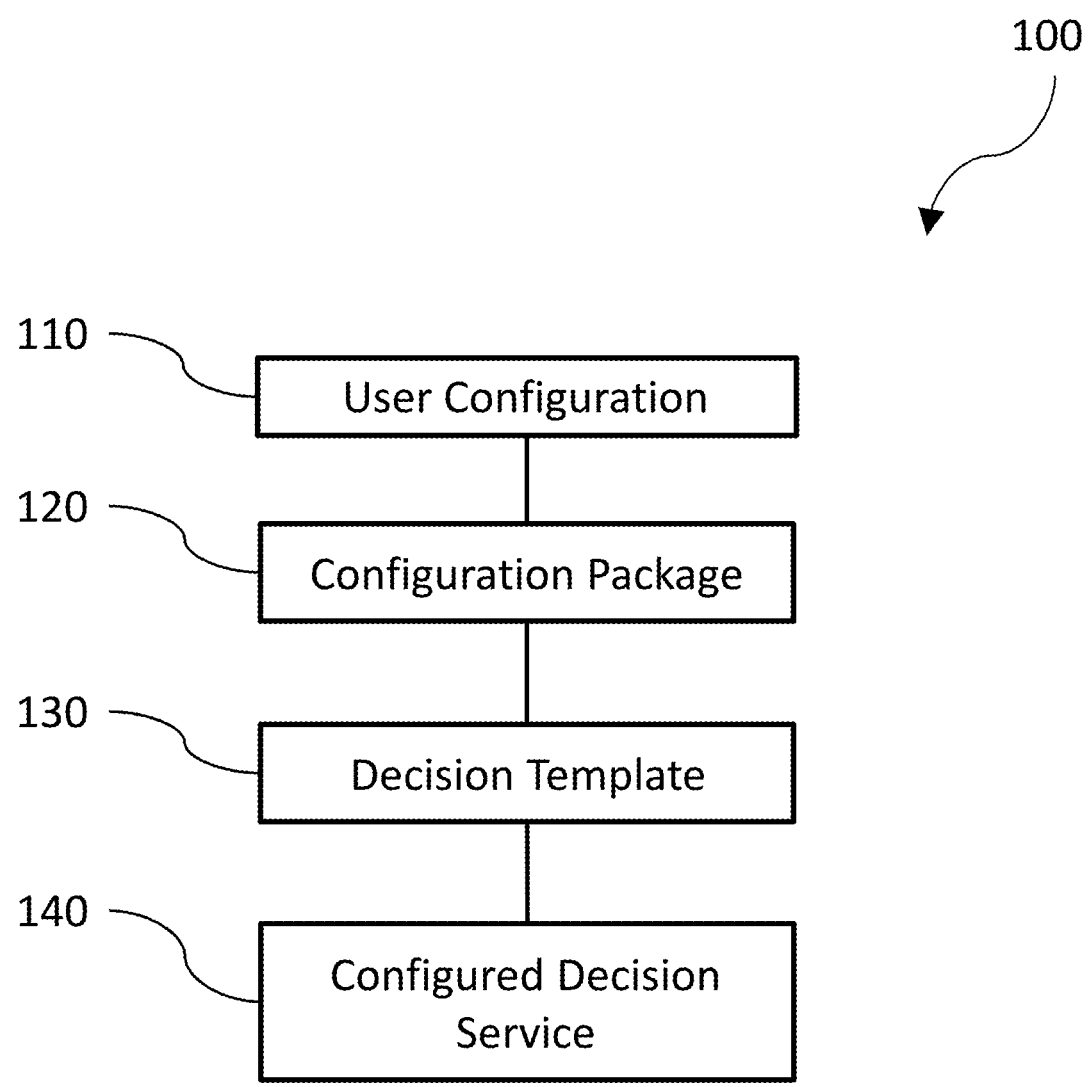
FIG. 1 is a diagram illustrating a system integrating a user configuration into a configuration package to be used with a decision template.

FIG. 1 is a diagram illustrating a system 100 integrating a user configuration 110 into a configuration package 120 to be used with a decision template 130. User configurations 110 can be used with different configuration packages 120, which are then integrated into the decision template 130 in order to generate a configured decision service 140. However, in the illustrated case, the decision template 130 is not altered or customized by the user. Only the configuration package 120 or the user configuration 110 changes from application to application. The decision template 130 can be, for example, a model, business program, manufacturing program, software development program, decision management program, etc.

The configuration package 120 can be used with the decision template 130 without having to alter the code of the underlying decision template 130. In one implementation, the configuration package 120 can be a preset code package that does not require user input. In another implementation, the configuration package 120 can require limited input from the user, e.g. the user configuration 110, but still not require any code changes to either the configuration package 120 or the decision template 130.

For example, a user wishes to use the decision template 130 for a particular application. The user can download the configuration package 120 to the computer and install it. Then, the user can be prompted for questions to allow the configuration package 120 to interface with the decision template 130, e.g. what kind of application, details on the job, etc. After the decision template 130 has been interfaced with the configuration package 120 the application can then run seamlessly without the user having had to customize the decision template 130. There can be any number of user configurations 110 and configuration packages 120, or any combination thereof, interfaced with the decision template 130.

Figure 2:
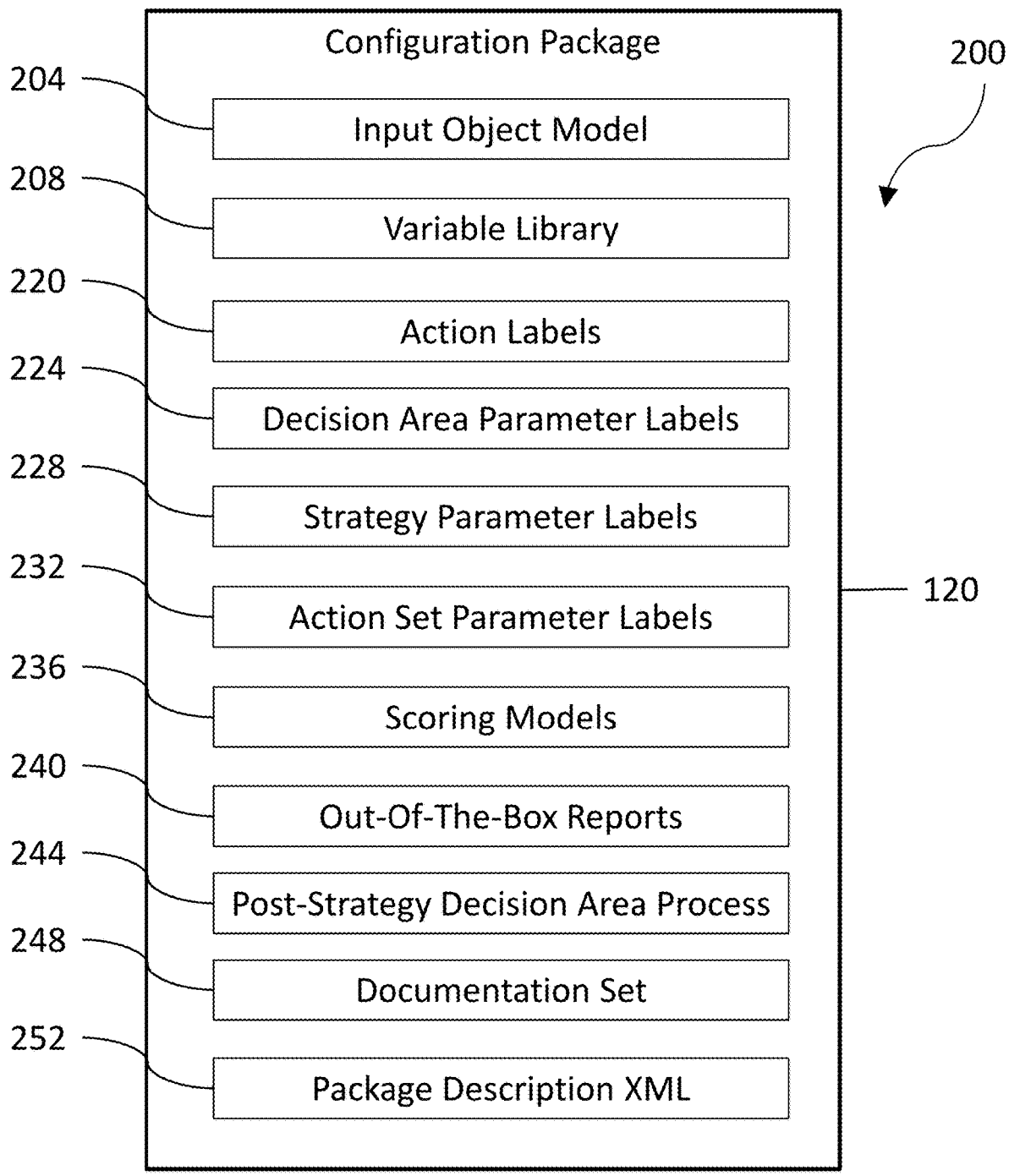
FIG. 2 is a diagram illustrating the configuration package containing a set of artifacts.

FIG. 2 is a diagram 200 illustrating a configuration package 120 containing a set of artifacts. The configuration package 120 can contain a set of artifacts that allow the configuration package 120 to interface with the decision template 130. The artifacts can be models, libraries, labels, etc. as described below. There can be any number or combination of artifacts in the configuration package 120 and the examples below are not intended to limit the number or type of artifacts used with the configuration package 120. The artifacts can be in a number of data formats, for example, XML, SRL, FSML, XSD, DB strings, MODEL BUILDER PROJECTS, BIRST files, PDF, etc.

In one implementation, there can be an input object model 204 included with the configuration package 120. The input object model 204 can define the entities made available to decision services, such as customer, account, transaction, or in other words the entity of focus, as well as the data elements that comprise them. The definition of "account" can be different for retail banking and, for example, telecom or healthcare or airlines, etc. The input object model 204 for an origination's configuration package 120 can include an application, not an account (though in other implementations it can also include accounts for the cases where the applicant already has accounts with the institution). The entity of focus is dependent on the domain, and so it can be stored as data inside the configuration package 120, and is not hard-referenced in the code or out-of-the-box data repository structure. The input object model 204 can be stored as an XML (Extensible Mark-up Language) file, an industry standard method of defining data.

In one implementation, there can be a variable library 208 included with the configuration package 120. Domain-specific solutions require targeted variables that will also depend on the input object model 204. Some variables are standard and can be contained in the configuration package 120, and the balance of the library can be user definable, where the user can enter his/her own code through the UI. Variables can also be imported and exported as needed. The variable library will be different for different configuration packages 120. For example, revolving account management will have different needs, terminology and data than telecom. The former can have variables such as average account balance last 6 months, or maximum account delinquency last 12 months, and the latter can have average long distance minutes last 3 months, etc. Since the variable library 208 can be part of the configuration package 120, when users import the configuration package 120, they can therefore get a domain-specific variable library 208 that matches the input object model 204 (which is also in the configuration package 120). The variable library 208 can be stored as SRL, or "STRUCTURED RULE LANGUAGE," a proprietary language of FAIR ISSAC CORPORATION.

In one implementation, the user configuration 110 can include exclusions. Similar to variables, exclusion logic is a test on the value of a variable (e.g. if Variable A<5 then exclude; otherwise don't). Exclusions in a revolving account management configuration package 120 can include time on books <12 months, or account is more than 3 cycles delinquent, whereas in a telecom configuration package 120, it might be account age <12 months, or service is suspended, etc. Exclusions can be stored as SRL.

In one implementation, there can be inclusions included with the user configuration 110. Inclusions are similar to exclusions, above, only based upon variable analysis the variable is included rather than excluded.

By way of introduction to 220, 224, 228, and 232, decision area parameters are holders for values that the decision process will use to make the decision. They are not input fields, but they are indirectly associated with the entity of focus (account, framework, etc.). The entire configuration package 120 is dependent on the entity of focus and the business problem being solved. For example, two configuration packages 120 in banking can have "account" as their entity of focus, but one might focus on checking accounts whereas the other might focus on credit cards. Each can have different decision area parameters. There are parameters provided at different levels:

decision area (so the values are set when you know what decision area you are doing, e.g. credit line management, fee waiver management, etc.), strategy (so the values are set when the strategy is set in the coarse classing step), action set (so the values are set in the fine classing step).

These parameters can be implemented in decision frameworks without configuration packages 120, or can be hard-wired into the framework code. The overarching idea is that there are some parameters you want to set at each of these three levels. They are all optional, and are referenced in the post-strategy decision area process, described below.

The configuration package 120 can include the labels for these things, but not the values themselves. The configuration package 120 can contain "cushion amount" and "over limit tolerance," etc., which are useful parameters to have when making an authorization decision, and "application cutoff age" is a useful parameter for an originations decision, etc., but the configuration package 120 does not have to specify what the actual percentage (or whatever) should be set to. The actual values can be set by the clients, and depend, for example, on how aggressive they are (or other factors coming from their strategic analyst roles) and can be subject to adjustment through time as part of champion/challenger testing. Clients set these parameters in the framework's user interface, and they are configuration, not customization.

In one implementation, there can be action labels 220 included with the configuration package 120. Labels can be used to label fields/values specific to a business problem or domain. Labels can also infuse proprietary software into configuration packages 120 by making most common actions and decision input parameters required to solve a business problem available and apparent to the user. For example, in a configuration package 120 for post-hospital discharge decisions, action labels 220 might reflect: nurse visits or doctor visit. In a debt collection setting, an action might recommend blocking the account, or routing to a collections queue. Labels can be stored as plain text in CSV (Comma Separated Values) format. The general features of labels described above can also apply to other types of labels described throughout the framework.

In one implementation, there can be decision area parameter labels 224 included with the configuration package 120. The decision area parameters, selected by the decision area parameter labels 224, are values made available to the decision process based on the decision area currently in process. Configuration packages 120 can contain multiple decision areas. For example, the configuration package 120 for deposit account decisions in retail banking may include decision areas for overdraft pay/no-pay decisions, fee waiver management, and deposit holds management, whereas the configuration package 120 for telecom may include decision areas for cross-sell, pricing and fee structure, account renewals, etc.

In one implementation, there can be strategy parameter labels 228 included with the configuration package 120. Strategy parameters, selected by the strategy parameter labels 228, are values made available to the decision process based on the strategy assigned to the entity of focus in the overall decision flow processing. Strategy assignment can occur in a coarse-classing preliminary decision step.

In one implementation, there can be action set parameter labels 232 included with the configuration package 120. Action set parameters can be values made available to the decision process based on the action set assigned in the executed strategy. Action sets can be assigned as a subsequent fine-classing decision step.

In one implementation, there can be scoring models 236 included with the configuration package 120. Whether and which predictive scoring models are delivered with initial installs is subject to licensing, so scoring models are optionally part of the configuration package 120. Scoring models 236 can be specific to a domain or business problem and can be chosen to include with the configuration package 120. In one implementation, scoring models 236 can be stored in the configuration package 120 as MODEL BUILDER/BLAZE ADVISOR projects, which is a FICO proprietary format. Models may also be stored in PMML (predictive Modeling Mark-Up Language), an industry standard specification of XML used to represent analytic scoring models.

In one implementation, there can be out-of-the-box reports 240 included with the configuration package 120. The out-of-the-box reports 240, can enable users to monitor and evaluate performance of the strategies supported by the configuration package 120 and the decision template 130. They can be generated per industry vertical and included in the configuration package 120. Out-of-the-box reports 240 can be stored in any format particular to the reporting package integrated into the decision template 130, for example BIRST, JASPER, or SAP BUSINESS OBJECTS, etc.

In one implementation, there can be a post-strategy decision area process 244 included with the configuration package 120. Following the execution of a strategy, further domain and business problem-specific items can be addressed the post-strategy decision area process 244 of the configuration package 120. By this stage in the process, the decision flow has processed general and decision area exclusions, strategy assignment (coarse classing), generated scores and other needed variables, etc., and performed fine segmentation in the strategy tree. At this point, some decision areas have specific logic that completes the decision processing, for example, credit facilities has logic to calculate the various limits, authorizations determines the accept-or-decline decision, etc. This logic can be stored in the configuration package 120 as SRL.

In one implementation, there can be a documentation set 248 included with the configuration package 120. Specific formats will be established in the development cycle and at the design level, but each package will have the documentation set 248 as a standard set of documents associated with and zipped up with the configuration package 120. The documentation set 248 can be in any format, e.g. MICROSOFT WORD, ADOBE PDF, etc., and describe the elements contained for the end-users.

In one implementation, there can be package description XML 252 included with the configuration package 120. Each configuration package 120 will have the package description XML 252 document and schema associated with it that will contain meta-data about the configuration package 120 such as domain, date-of-issue, versioning of each element, number and description of each element, etc. The package description XML 252 can be used in package features such as import and export, and may also be useful for customer support.

Figure 3:
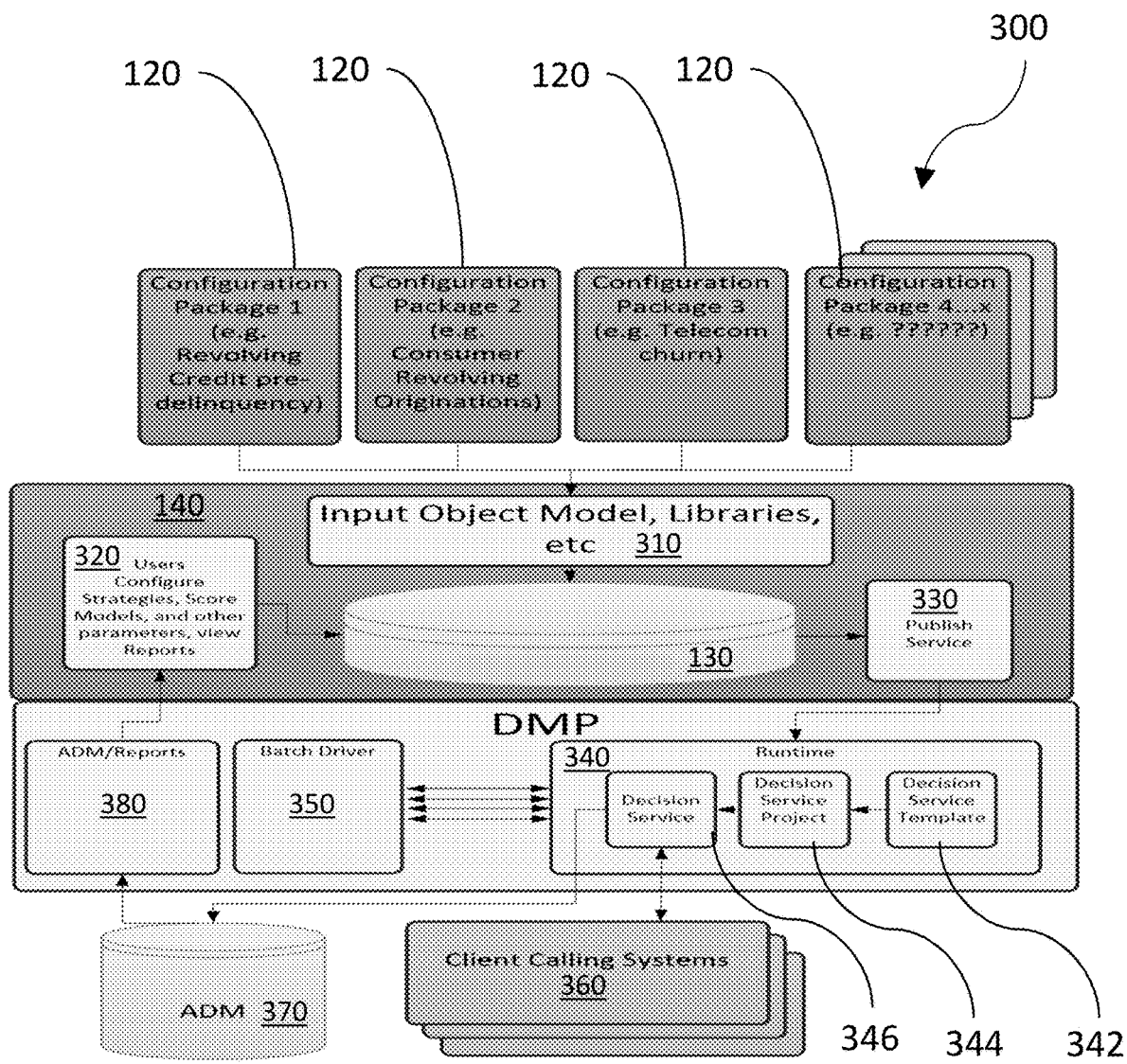
FIG. 3 is a process flow diagram illustrating multiple configurations packages integrated into a decision template.

FIG. 3 is a process flow diagram 300 illustrating multiple configurations packages 120 integrated into the decision template 130. In the implementation shown, the configuration packages 120 can be accumulated into a set of configuration packages 310 that include, for example, input object models, libraries, etc. Then, the configuration packages 120 can be integrated with the decision template 130, to form a configured service decision 140. In the example shown in FIG. 3, the configuration packages 120 are added to a Strategy Director framework to form the configured Strategy Director.

At 320, users can configure strategies, score models, and other parameters. Users can also view reports or perform other operations or tasks.

At 330, the service can be published to another program, in this case the DECISION MANAGEMENT PLATFORM (DMP). Details regarding DMP can be found, for example, in U.S. Pat. App. Ser. No. 61/928,951, the contents of which are hereby fully incorporated by reference.

At 340, during runtime of the DMP, a decision service template 342 can be loaded into a decision service project 344 to render a decision service 346.

At 350, batch drivers can be loaded for use by the DMP during 340.

At 360, a client calling system can be used to contact clients for implementation of decisions reached by the DMP.

At 370, the results of the decisions made with the DMP can be sent to the ANALYTIC DATA MART (ADM). The ADM is a data repository that is output by processing customer data through the aggregated decision template 130 configured with the configuration packages 120. The ADM contains the values calculated by the system on all relevant artifacts of the configuration package 120, e.g. input data, variables, etc.

At 380, reports from the ADM can be put back into the DMP for later use by the DMP or for using configuring the decision template 130, as described in 320, above.

Figure 4:
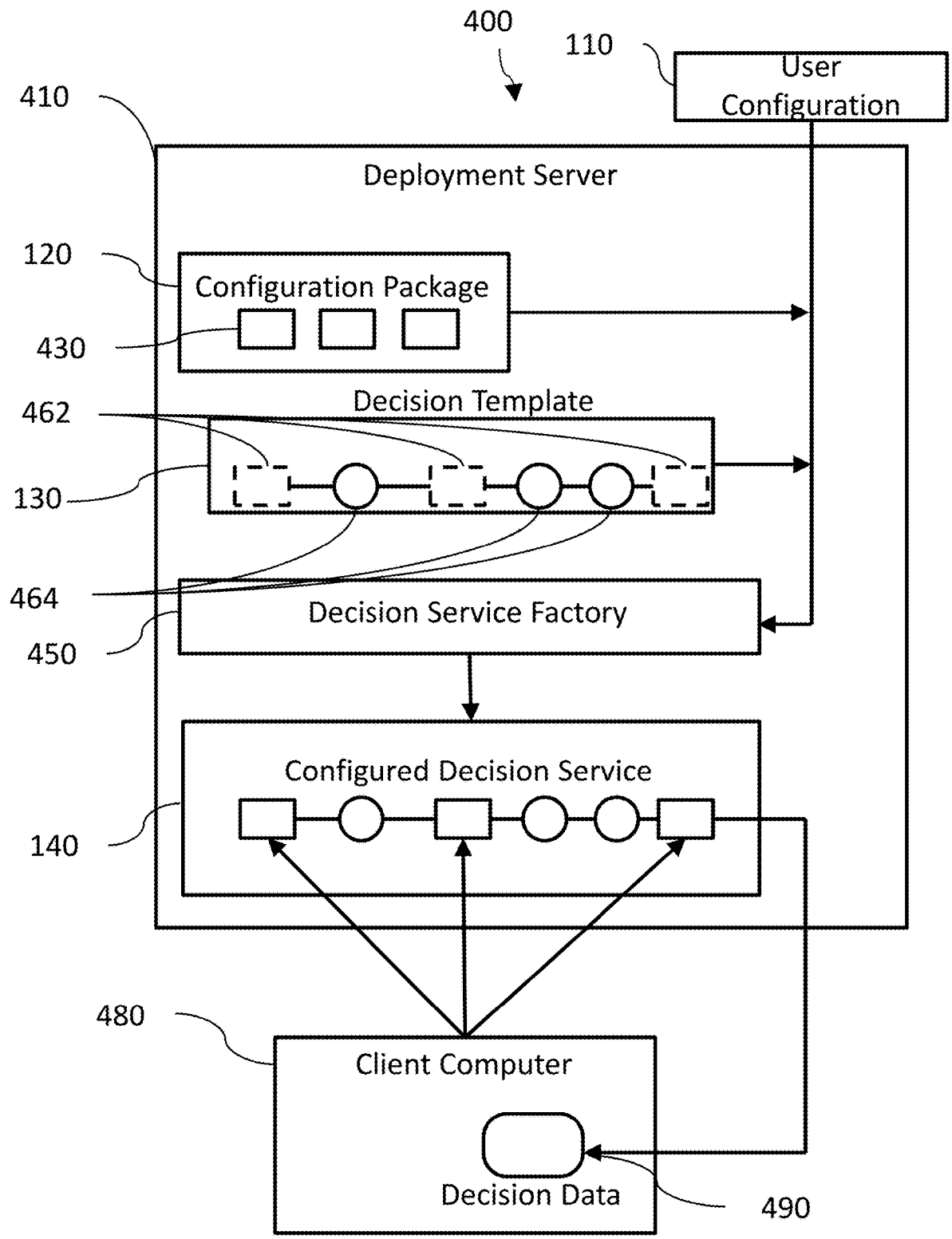
FIG. 4 is a diagram illustrating a configuration package configuring a framework for generating decision data by a decision service.

FIG. 4 is a diagram 400 illustrating a configuration package 120 configuring a decision template 130 for generating decision data 490 by a configured decision service 140. The configured decision service 140 can be called from, or exported to, a client computer 480 in order to provide decision data 490 based on what specifically the configured decision service 140 is asked to analyze. Once the configured decision service 140 is configured by the configuration package 420 and the user configuration 110 to accept certain types of data and make certain logical decisions, the configured decision service 140 can accept specific input, for example from a client computer 480 and provide decision data 490.

As one example, a simple decision service could determine if a bank fee should be waived. The decision template 130 for making a decision about the fee could be based on two elements, with each element having a weighting depending on the type of element chosen. Accordingly, the decision template 130 could have two configurable decision elements and two non-configurable elements (the weightings). A user could implement the configuration package 420 to select, via the user configuration 110, that the two configurable decision elements are: (1) an existing account balance and (2) the amount of the fee. Also, for example, the non-configurable decision elements (the weightings) could be determined based on the configurable decision elements selected. Once configured, the decision service 450 could accept input from a client computer 480 that specifies a specific account balance and a specific amount of the fee. The decision service 450 could then, using the configured framework 460, generate the decision data 490 (waive or not waive) based on the specific input given to the configured framework 460.

As shown in FIG. 4, a configuration package 420 can include any number of artifacts 430 or references to artifacts 430 from an artifact library in a configuration database. As described above, the artifacts 430 can represent a data type (or input object model), logical operations or quantities that have to be determined at run-time (variables), scoring models, etc. The artifacts 430 can accordingly correspond to an input or an input type received by the configured decision service 140 from an external source, such as a client computer 480.

A decision service factory 450 can receive the configuration package 420 from within the deployment server 410 or from a remote computing system separate from the deployment server 410. The decision service factory 450 can be a code module that accepts the artifacts 430 in the configuration package 420 and distributes or transmits the artifacts 430 to the appropriate location in the decision template 460. As discussed above, the configuration package 420 can be configured based on user-generated input and/or the user configuration 110, further configuring the configured decision service 140. The decision service factory 450 can also receive the decision template 130 and the user configuration 110. The user configuration can specify a parameter, for example a particular feature, in one or more of the artifacts 430. The artifacts 430 specified by the configuration package 120 can be combined with the user configuration 110 and the decision template 130 to generate the configured decision service 140. The decision service factory 450 and the configured decision service 140 can be located in any computing system, for example, in a deployment server 410 that distributes configured decision services 140, in a remote system, etc.

As noted above, the decision template 130 can contain any number of configurable decision elements 462 and non-configurable decision elements 464. The simple linear sequence shown in FIG. 4 is intended to be exemplary only. The order of the decision elements can vary and there can be any number of decision elements connected to a given decision element.

In one implementation, once the configured decision service 140 is completed, there can be a consistency check to ensure that the configuration of the configured decision service 140 is consistent or does not violate any predetermined rules. For example, the consistency check could determine if, as a result of the user configuration 110 applied to the configuration package 120, the configured framework 460 would enter into a loop or have an invalid output when calculating the decision data 490. If a violation is detected, an error message can be generated that describes the violation. The error message can then be transmitted to another computer, displayed on a graphical user interface, or otherwise communicated to one or more users or connected computing systems.

The configured decision service 140 can receive, from a client computer 480, input for the configurable decision elements. The input can be specific data of the type that is required by the configured decision service 140. For example, if a configured element is an account balance, the input for that configured element could be a numerical value corresponding to the account balance for a particular account.

Once the input has been received by the configured decision service 140, the configured decision service 140 can generate decision data 490 based on the received input, and the non-configurable decision elements 464. The decision data 490 can be, for example, a binary "yes/no" decision, a score, a probability, a recommendation, a combination of a number of such entities, etc. The generated decision data 490 can then be transmitted to the client computer 480 or any number of connected computing systems.

In one implementation, the configured decision service 140 or the decision template 130 can be transferred to a remote computing system. Such publishing of data can enable the remote computing system to locally implement the configured decision service 140 without requiring a connection to the deployment server 410.

In another implementation, the configurable decision elements can be updated in response to changes in artifacts 430 received by the decision service factory 440. The updating can be based on a user optimizing the artifacts 430 that go into the decision template 130 in order to improve accuracy of generated decisions.

In yet another implementation, the input can be received by calls to the client computer 480 as it runs a web service. In this way, both the configuration package 120, and the input originating from the client computer 480, can be managed by one or more client-side computing systems. Also, the web service can enable use of the decision service 450 via graphical user interfaces, browsers, and so on, from a single networked computer.

One or more aspects or features of the subject matter described herein can be realized in digital electronic circuitry, integrated circuitry, specially designed framework 460 specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software frameworks, frameworks, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for configuring a decision service to generate decision data, the method comprising:

constructing, using a first computing system, a first configuration package comprising a first set of one or more artifacts, in response to receiving a first input selecting one or more artifacts from an artifact library, the one or more artifacts being configurable to allow the first configuration package to interface with a decision template comprising one or more decision elements, in response to a first configuration received by way of the first input, the first configuration specifying a parameter associated with the one or more artifacts in the first configuration package; and generating a first configured decision service by integrating the first configuration package into the decision template, the first configured decision service generating first decision data communicated to a second computing system coupled with the first computing system, in response to receiving from the second computing system a second input associated with the one or more decision elements in the decision template.

2. The method of claim 1, further comprising constructing a second configuration package, in response to receiving a second input selecting a second set of one or more artifacts and generating a second configured decision service by integrating the second configuration package into the decision template.

3. The method of claim 2, wherein a first artifact library comprises a first variable library for the first configuration package and a second artifact library comprises a second variable library for the second configuration package.

4. The method of claim 1, wherein the artifact library comprises a variable library comprising standard variables and user definable variables.

5. The method of claim 1 further comprising verifying that the first configured decision service complies with one or more predetermined rules.

6. The method of claim 5, wherein the verifying comprises performing a consistency check to determine whether the first configured decision service violates one or more predetermined rules and the method further comprises generating an error message describing a violation of at least one predetermined rule.

7. The method of claim 5, wherein the first input is received by at least one call to a client computer running a web service.

8. The method of claim 7, wherein the first input is received by the first decision service from the client computer, in response to a consistency check indicating that the first configured decision service does not violate at least one predetermined rule.

9. The method of claim 1, wherein the decision template comprises at least one configurable decision element.

10. The method of claim 1, wherein the decision template comprises at least one non-configurable decision element.

11. The method of claim 1, wherein the decision template is not directly configurable by a human user.

12. The method of claim 1, further comprising updating the at least one decision element to correspond to at least one of the one or more artifacts.

13. A computer-implemented system for configuring a decision service to generate decision data, the system comprising one or more processors for executing logic code, the logic code when executed by the one or more processors causes the system to:
construct a first configuration package comprising a first set of one or more artifacts, in response to receiving a first input selecting one or more artifacts from an artifact library,
the one or more artifacts being configurable to allow the first configuration package to interface with a decision template comprising one or more decision elements, in response to a first configuration received by way of the first input, the first configuration specifying a parameter associated with the one or more artifacts in the first configuration package; and
generate a first configured decision service by integrating the first configuration package into the decision template,
the first configured decision service generating first decision data communicated to a second computing system coupled with a first computing system, in response to receiving from the second computing system a second input associated with the one or more decision elements in the decision template.

14. The system of claim 13, wherein a second configuration package is constructed, in response to receiving a second input selecting a second set of one or more artifacts and a second configured decision service is generated by integrating the second configuration package into the decision template.

15. The system of claim 13, wherein the artifact library comprises a variable library comprising standard variables and user definable variables.

16. The system of claim 14, wherein a first artifact library comprises a first variable library for the first configuration package and a second artifact library comprises a second variable library for the second configuration package.

17. The system of claim 13, wherein it is verified whether the first configured decision service complies with one or more predetermined rules.

18. The system of claim 17, wherein the verification comprises performing a consistency check to determine whether the first configured decision service violates one or more predetermined rules.

19. A non-transitory computer-readable medium comprising logic code for configuring a decision service to generate decision data, the logic code when executed by the one or more processors causes the one or more processors to:
construct a first configuration package comprising a first set of one or more artifacts, in response to receiving a first input selecting one or more artifacts from an artifact library,
the one or more artifacts being configurable to allow the first configuration package to interface with a decision template comprising one or more decision elements, in response to a first configuration received by way of the first input, the first configuration specifying a parameter associated with the one or more artifacts in the first configuration package; and
generate a first configured decision service by integrating the first configuration package into the decision template, the first configured decision service generating first decision data communicated to a second computing system coupled with a first computing system, in response to receiving from the second computing system a second input associated with the one or more decision elements in the decision template.

20. The non-transitory computer-readable medium of claim 19, wherein a second configuration package is constructed, in response to receiving a second input selecting a second set of one or more artifacts and a second configured decision service is generated by integrating the second configuration package into the decision template,
wherein the artifact library comprises a variable library comprising standard variables and user definable variables,
wherein a first artifact library comprises a first variable library for the first configuration package and a second artifact library comprises a second variable library for the second configuration package, and
wherein the first configured decision service verification complies with one or more predetermined rules and the verification comprises performing a consistency check to determine whether the first configured decision service violates one or more predetermined rules.

* * * * *